(12) United States Patent
Mentink et al.

(10) Patent No.: US 8,470,119 B2
(45) Date of Patent: Jun. 25, 2013

(54) USE OF A LEGUMINOUS STARCH IN AN ADHESIVE LABELING COMPOSITION

(75) Inventors: Léon Mentink, Roubaix (FR); Jacques Tripier, Labeuvriere (FR)

(73) Assignee: Roquette Freres, Lestrem (FR)

( * ) Notice: Subject to any disclaimer, the term of this patent is extended or adjusted under 35 U.S.C. 154(b) by 1431 days.

(21) Appl. No.: 10/557,614

(22) PCT Filed: May 28, 2004

(86) PCT No.: PCT/FR2004/001331
§ 371 (c)(1),
(2), (4) Date: Nov. 22, 2005

(87) PCT Pub. No.: WO2004/108853
PCT Pub. Date: Dec. 16, 2004

(65) Prior Publication Data
US 2007/0066817 A1    Mar. 22, 2007

(30) Foreign Application Priority Data
May 30, 2003    (FR) ...................................... 03 06584

(51) Int. Cl.
| C04B 37/00 | (2006.01) |
| B29D 22/00 | (2006.01) |
| B29D 23/00 | (2006.01) |
| B32B 1/08 | (2006.01) |
| B31B 45/00 | (2006.01) |
| B28B 11/00 | (2006.01) |
| B28B 21/00 | (2006.01) |

(52) U.S. Cl.
USPC .......................... 156/325; 428/34.1; 428/34.4

(58) Field of Classification Search
USPC .................. 156/325; 428/34.1, 34.4
See application file for complete search history.

(56) References Cited

U.S. PATENT DOCUMENTS

| 4,235,939 A * | 11/1980 | Kimberly, Sr. ................ 426/549 |
| 4,336,166 A | 6/1982 | Penczuk et al. |
| 4,462,838 A | 7/1984 | Andres et al. |
| 4,464,202 A * | 8/1984 | Andres et al. .............. 106/140.3 |
| 4,675,351 A | 6/1987 | Brown |
| 4,804,414 A | 2/1989 | Gleason |
| 4,964,939 A * | 10/1990 | Gleason ........................ 156/336 |
| 5,441,562 A | 8/1995 | Broich et al. |
| 5,455,066 A | 10/1995 | Broich et al. |
| 5,641,349 A | 6/1997 | Koubek et al. |
| 2002/0142031 A1* | 10/2002 | Gilleland et al. ............. 424/451 |
| 2003/0064178 A1 | 4/2003 | Smith et al. |

FOREIGN PATENT DOCUMENTS

| FR | 0 511 916 A1 | 11/1992 |
| WO | 01/08894 | 2/2001 |
| WO | 01/85866 | 11/2001 |
| WO | WO 03029378 | 10/2003 |

OTHER PUBLICATIONS

Wajiras, Ratnayake et al., "Pea starch: Compositon, Structure and Properties—A Review", vol. 54, 2002, pp. 217-234, XPOO2269066 Wenheim, Germany, paragraphs 001, 007, 008, Table 1.

* cited by examiner

*Primary Examiner* — Michael Orlando
(74) *Attorney, Agent, or Firm* — Young & Thompson

(57) ABSTRACT

The invention relates to the use of a native or modified leguminous starch for producing an adhesive labeling composition. Said leguminous starch has an amylose content ranging between 25 and 60 percent by weight (dry/dry) and can be embodied as pea starch, especially pea starch having an amylose content of at least 30 percent but less than 50 percent by weight. The adhesive composition can advantageously be used for labeling glass or plastic bottles and can contain another natural polysaccharide polymer or protein polymer in addition to the leguminous starch, for example another native or modified leguminous or non-leguminous starch, particularly a starch having an amylopectin content of at least 80 percent by weight (dry/dry). The use of a leguminous starch makes it possible to obtain labeling adhesives, optionally highly dry (>40%) substances, which have excellent characteristics regarding stability during storage, rheology, and water resistance.

19 Claims, No Drawings

USE OF A LEGUMINOUS STARCH IN AN ADHESIVE LABELING COMPOSITION

This is a 371 National Stage application of International application no. PCT/FR2004/001331, filed May 28, 2004, which claims priority to French application no. 03/06584, filed May 30, 2003. The entire contents of the above-referenced applications are hereby incorporated by reference in their entirety.

The subject of the present invention is the use of a legume starch in a labeling adhesive composition.

It relates most particularly to the use of such a starch in an aqueous glue intended for labeling operations performed on bottles, in particular made of glass.

It also relates to the combined use, in the abovementioned labeling field, of a legume starch and of at least one other polymer of natural origin, of a polysaccharide or protein nature.

BACKGROUND OF THE INVENTION

The use of material of natural origin in the preparation of labeling adhesives has been widely described and industrially exploited for decades. That is in particular the case for aqueous glues based on casein and/or on starchy materials intended for affixing paper labels to glass supports.

In general, a labeling adhesive should satisfy all the criteria a) to i) below:

a) possess general rheological properties suitable for the unit operations preceding the actual process of sticking between the label and the support and in particular suitable for the increasingly fast and efficient processes and devices for the preparation, transport and deposition of the glues, for positioning the labels on their supports and for bottling.

It should be possible to obtain these suitable rheological properties for adhesives having relatively high dry solids contents, i.e. greater than 40% while having the desired viscosities, for example of between 20,000 and 150,000 mPa·s (at 25° C.) for glues intended for labeling glass bottles.

b) possess in particular sufficient "tack" properties, i.e. a sufficient capacity, before any significant loss of water from the adhesive initiating the actual bonding phenomenon, to keep assembled the two substrates (label and support) as soon as they are placed one onto the other.

This minimum tack should for example make it possible to avoid a paper label which has just been affixed to a glass bottle sliding along the latter. This result must be obtained on a bottle whose surface is either wet or dry.

c) possess in particular a so-called "short" texture, i.e. a texture allowing effective and clean distribution of the glue, including at high speeds, and in particular limiting the formation of "filaments", smears and/or discharges, which are sources of dirt marks on the labeling machine.

d) develop, after positioning the label on its support, and then preserve sufficient adhesive properties, this being in all types of environment. The adhesive should in particular possess good resistance to water, including condensation water. Bottles (of wine, champagne, beer and the like) are often placed in a refrigerator, an ice bucket or in cold water in order to cool their content. It is then essential, including from an esthetic point of view, that the label does not become detached from its support in such an environment.

e) allow, in view of increasingly frequent operations for reusing or recycling glass or plastic articles, the detachment of the label under simple and inexpensive conditions, without leaving marks or residues on said articles. The adhesive should in particular be easily and completely removable from the surface of the article by a conventional treatment of washing at high temperature, optionally in an alkaline bath.

f) possess acceptable organoleptic characteristics (including transparency, color, odor) for the manufacturer and then the applicator (bottler for example) of the adhesive and for the successive handlers or users of the marketed labeled article.

g) preserve during storage, if possible for at least several months, the general or specific rheological characteristics, the adhesive characteristics, the possibilities of removal and the organoleptic characteristics as mentioned in points a) to f) above.

h) exhibit the harmlessness and good biodegradability, in particular in relation to ever restrictive regulations in terms of protection of humans and of their environment.

i) have the simplest and most "natural" composition possible and the lowest cost price possible.

It appears however that both casein and starchy materials do not always make it possible to satisfy all the abovementioned criteria a) to i).

Casein is a protein of animal origin (protein extracted from milk) which is soluble in a basic medium and which has the property of very considerably viscosifying upon cooling. This makes this polymer particularly of interest in labeling operations on cold and wet glass. Because of the thermoreversibility of this phenomenon, casein is additionally relatively easily removable by washing at high temperature.

However, casein has the following disadvantages:
  poor suitability for labeling operations on hot glass (pasteurized bottles for example) precisely because of the high dependence of its viscosity on the temperature conditions,
  need for washing in a basic medium for the purpose of operations for recycling bottles and other articles,
  strong characteristic odor and pronounced coloration,
  high cost, in particular compared with that of starchy materials, and subject to large fluctuations.

Starchy materials have overall the advantages of a relatively low and stable cost, ease of removal with water and appropriate organoleptic properties.

Among these starchy materials, the so-called "amylopectin-rich" or waxy starches confer most particularly on the glues into which they are introduced, a very good storage stability and, through chemical modification, a "short" texture as defined above. That is, for example, the case for the product called "DEXYLOSE® I 231", developed and marketed by the applicant.

However, in general, glues based on starchy materials have the following disadvantages:
  lack of tack on a cold and/or wet support, and
  poor resistance to water.

The abovementioned polymers (casein, starchy materials) therefore do not always make it possible to have adhesives which satisfy all the abovementioned criteria a) to i).

One of the problems linked to the use of these polymers in labeling adhesives consists in particular in simultaneously obtaining characteristics of good resistance to water (cf. abovementioned criterion d)) and of easy removal by simple washing with hot water (cf. abovementioned criterion f)), it being possible to consider these characteristics as being antinomic.

For the purposes of obtaining an acceptable compromise between these characteristics, aqueous adhesives have been proposed, which combine starches and synthetic resins such as ammonium salts of styrene-maleic anhydride copolymers. Such resins, which are not very biodegradable, cause environmental problems, in particular in the water for washing recycled bottles. In addition, as underlined in U.S. Pat. No.

4,336,166, these additives do not exhibit the desired rheological and stability characteristics. To this effect, said patent proposes replacing said ammonium salts with zinc salts of the same styrene-maleic anhydride resins.

However, the aqueous compositions recommended in this patent U.S. Pat. No. 4,336,166 are in practice:
  relatively complex because they also contain, in particular, bentonite and a plasticizer system based on glycol benzoates,
  relatively expensive and not very biodegradable because of the relatively high proportion (3 to 20% dry/dry) as resin emulsion and the relatively low contentin starch(es) (35% dry/dry maximum)

Other solutions have been proposed in order to improve the rheological and stability characteristics of aqueous glues intended for labeling glass articles.

U.S. Pat. No. 4,462,838 describes polymeric compositions necessarily containing an oxidized starch ether, generally a hydroxypropylated ether of oxidized potato starch, and at least a second polymer of natural origin (other starch derivatives, casein and/or cellulose derivatives) or of synthetic origin (polyvinyl alcohol, polyacrylamide, polyvinyl pyrrolidone), the second polymer necessarily having to be soluble in water and to be used before the oxidized starch ether during the preparation of the adhesive.

The adhesive compositions exemplified in this document are complex and expensive because they use, in the majority of cases, at least three different polymers out of which two are modified starches, namely, in a precise order, a cationic starch solubilized in water and then oxidized starch ether necessarily present.

Moreover, the characteristics of resistance to water and the possibilities of removal with hot water of these compositions are not studied in this patent U.S. Pat. No. 4,462,838.

For its part, U.S. Pat. No. 4,675,351 recommends a combination between solubilized soybean protein(s), synthetic polymer and starch or flour, in order to obtain an aqueous labeling glue having appropriate rheological characteristics, the water resistance of said glue being conferred by the use of zinc oxide.

The adhesives obtained are presented as being easily removable by washing with hot alkaline water.

However, no result is presented as to the possible preservation of all of these characteristics after the storage of such glues.

Moreover, the method for producing these adhesives appears to be relatively complex and expensive. In any case, it necessarily involves the significant use (of 1 to 10% by weight) of a synthetic polymer (polyvinyl acetate emulsion) and a limited use of starches (15% by weight maximum).

U.S. Pat. No. 4,804,414 recommends the use of a resin consisting of the solubilized product of neutralization of an alkaline base and a rosin composition selected so as to confer good characteristics of resistance to water and removal in alkaline water on these aqueous starchy glues. It appears, however, that in practice, in order to obtain such characteristics, the starch must necessarily a) be a so-called "amylopectin-rich" or waxy starch, i.e. containing more than 5% by weight of amylose and b) be combined with a high proportion (40 to 50% weight of starch) of selected rosin resin.

More recently, selected resins or gums based on rosin have also been combined with casein and possibly with a starch, in the preparation of aqueous labeling glues as described in U.S. Pat. Nos. 5,455,066 and 5,441,562. But here again, said resins or gums represent, according to the examples of said patents, a very high percentage (at least 30-35% by weight) of the dry solids content of said glues. In addition, to obtain good, in particular rheological and/or adhesive, properties, said glues must contain substantial levels of mono- or polyhydric alcohols such as methanol, ethylene glycol or glycerol.

U.S. Pat. No. 5,641,349 describes, in its EXAMPLE 31, an aqueous labeling glue for bottles based on cassava starch treated according to a particular so-called thermal inhibition process.

This adhesive, which is not very biodegradable, contains a high proportion, namely 50%, expressed by weight relative to the weight of cassava starch, of a synthetic resin of the ethylene-vinyl acetate (EVA resin) type.

The applicative performance features of the glue obtained, in particular in terms of resistance to water and removal with hot (alkaline) water, are not at all detailed.

More recently still, the use of EVA resins has been recommended and exemplified:
  in combination in particular with zinc oxide, in the context of the preparation of aqueous labeling glues of improved thixotropy based on casein as described in application WO 01/08984, or
  in combination in particular with ammonium hydroxide and rosin resin, in the context of the preparation of aqueous labeling glues based on casein or a starchy mixture (starch blend of unspecified composition) having good resistance to cold water as described in application WO 01/85866.

Finally, it has been proposed, in application US 2003/0064178, or in the equivalent application WO 03/029378, to prepare aqueous labeling glues especially suitable for the positioning of transparent plastic labels on containers made of glass and characteristically containing gelatin and at least one starch.

It is stated, in very broad terms, that said starch may be derived from cereals, tubers, roots, legumes or fruits, the term "pea" being mentioned within a very long list of native starches which can be potentially used.

However, very preferably, these glues contain an "amylopectin-rich" or waxy starch, it being possible for the latter in particular to consist of a pregelatinized modified waxy maize starch such as the abovementioned product "DEXYLOSE® I 231", which is used in all the examples in this document.

Some teachings of this application US 2003/0064178 or WO 03/029378 are in addition ambiguous and contradictory in the sense that:
  on the one hand, it is stated that the "amylopectin-rich" starch may be advantageously combined with an "amylose-rich" starch, but
  on the other hand, the only starches cited or exemplified in combination with said DEXYLOSE® I 231 are respectively a) the product called "COLLYS® BR" marketed by the applicant and consisting of a crosslinked wheat starch or b) the product called "SOLVICOL GP 45" marketed by the company AVEBE and presented as a hydrolyzed potato starch.

It has to be recognized that neither of these two products is an "amylose-rich" starch since the first is derived from wheat starch and therefore has an amylose content of the order of 24 to 28% and the second is derived from potato starch and therefore has an amylose content of the order of 20 to 23%.

None of said examples therefore describes the use of a truly "amylose-rich" starch. Moreover, all the compositions exemplified contain, inter alia, a crosslinking agent consisting of zinc carbonate. In addition, it is simply mentioned in general terms in this application that the adhesives prepared have a good wet tack and good characteristics of clarity and transparency. No detail or figure is given in particular as regards the characteristics of resistance to water, the possibilities of removal with hot water and the characteristics of storage stability of these adhesives or of their applicability for other labels than those made of plastic, in particular for paper labels.

As a result of the foregoing, no means currently exists which makes it possible to provide a labeling adhesive, applicable in particular to paper-based labels, which satisfies all the abovementioned criteria a) to i).

In particular, no means exists in this field which makes it possible in a simple, inexpensive and ecologically acceptable manner, to obtain good compromise:

a) on the one hand, between a good resistance to water (cf. abovementioned criterion d)) and possibilities for easy removal by simply washing with hot water (cf. abovementioned criterion e)) and a high biodegradability (cf. abovementioned criterion h)), b) on the other hand, between a good resistance to water, good rheological properties (cf. abovementioned criteria a) to c)) and a good storage stability (cf. abovementioned criterion g)).

It is to the applicant company's credit to have found that such a means could consist in the use of a selected starch, in the present case, from a legume starch, the latter additionally having a particular amylose content.

SUMMARY OF THE INVENTION

More specifically, the subject of the present invention is the use, for the preparation of a labeling adhesive composition, of a native or modified legume starch having an amylose content at least equal to 25% and at most equal to 60%, these percentages being expressed by dry weight of amylose relative to the dry weight of starch.

DETAILED DESCRIPTION OF THE INVENTION

The expression "labeling adhesive composition" is understood to mean any composition intended to allow the sticking, at least temporarily, of a label of any type (based on paper and/or other materials, in particular plastic materials) to an article or container of any type (made of glass, plastic, wood or other materials).

These compositions may be intended in particular for the labeling methods and/or devices described or exemplified in any one of the abovementioned prior art documents, in particular those which allow the sticking, at least temporarily, of a paper- or plastic-based label to a glass or plastic bottle.

These compositions may have in particular widely varying dry solids contents, of less than or greater than 40% and widely varying viscosities, including BROOKFIELD viscosities measured at 25° C., of less than 20 000 mPa·s or greater than 150 000 mPa·s.

According to an advantageous variant of the invention, a legume starch is used in an aqueous glue allowing the labeling of a glass bottle with a paper-based label.

The expression "legume", for the purposes of the present invention, is understood to mean any plant belonging to the Caesalpiniaceae, Mimosaceae or Papilionaceae families and in particular any plant belonging to the Papilionaceae family such as, for example, the pea, haricot bean, broad bean, field bean, lentil, alfalfa, clover or lupine.

This definition includes in particular all the plants described in any of the tables contained in the article by R. HOOVER et al. entitled "Composition, structure, functionality and chemical modification of legume starches: a review" CAN. J. PHYSIOL. PHARMACOL. VOL. 69, 1991, pp. 79-92.

Preferably, the legume is selected from the group comprising the pea, haricot bean, broad bean and field bean.

Advantageously, it is the pea, the term "pea" being considered here in its, broadest sense and including in particular:

all the wild varieties of "smooth pea", and all the mutant varieties of pea having an amylose content as selected, regardless of the uses for which said varieties are generally intended (human consumption, animal nutrition and/or other uses).

Said mutant varieties are in particular those called "mutant rug 4" or "mutant rug 5" as described a) in the article by C-L HEYDLEY et al. entitled "Developing novel pea starches" Proceedings of the Symposium of the Industrial Biochemistry and Biotechnology Group of the Biochemical Society, 1996, pp. 77-87 or b) in the article by W. S. RATNAYAKE et al. entitled "Pea starch: Composition, Structure and Properties—A review" Starch/Starke, Vol. 54, 2002, pp. 217-234.

According to another advantageous variant, the legume is a plant, for example a pea or field bean variety, which gives seeds containing at least 25%, preferably at least 40%, by weight of starch (dry/dry).

The expression "legume starch" is understood to mean any composition extracted, in any manner whatsoever, from a legume, and in particular from a Papilionaceae, and whose starch content is greater than 40%, preferably greater than 50% and more preferably still greater than 75%, these percentages being expressed by dry weight relative to the dry weight of said composition.

Advantageously, this starch content is greater than 90% (dry/dry). It may in particular be greater than 95%, including greater than 98%.

According to another variant, the protein content of said composition is less than 25%, preferably less than 10%, these percentages being expressed by dry weight relative to the dry weight of said composition. This content may in particular be less than 5%, including less than 1%. It may advantageously be between 0.1 and 0.8% (dry/dry).

The composition which can be used as "legume starch", for the purposes of the present invention, may moreover contain various constituents other than starch and proteins, in particular fatty substances, colloidal substances, fibers and inorganic elements, generally in a total content of less than 10% (dry/dry). This total content may be in particular less than 5%, including less than 1%. As regards specifically the fiber content of the legume starch which can be used according to the invention, this content is generally at most equal to 8%. Advantageously, this content is less than 4% (dry/dry) and may also be less than 1%.

According to a first variant, the amylose content of the starch contained in said composition is between 28 and 55% (dry/dry).

The applicant company has moreover found that, among the many starches obtained from wild or mutant varieties of pea or other legumes, those which specifically have an "intermediate" amylose content, i.e. at least equal to 30% and less than 50%, were most particularly suitable for an efficient use in labeling adhesives and in particular aqueous glues intended for sticking paper-based labels to glass articles.

And it is remarkable to emphasize, as has been surprisingly observed by the applicant and as will be moreover exemplified, that legume starches, and in particular those having an "intermediate" amylose content, could here, including in the native state, without having undergone any modification:

not only advantageously replace, and if desired, completely replace modified, in particular crosslinked, starches obtained from cereals or tubers generally containing lower amylose contents, but also partially replace modified, in particular crosslinked, starches containing high amylopectin contents.

This is all the more surprising since it has long been established that amylose, a linear polymer, does not make it possible to obtain, or greatly impair, the storage stability of aqueous starchy glues.

The legume starch which can be used for the preparation of the labeling adhesive compositions in accordance with the invention may be a native starch, i.e. not having undergone any modification treatment, or having undergone at least one modification treatment, preferably selected from the group comprising chemical treatments, physical treatments and enzymatic treatments.

The chemical treatments comprise in particular all known operations of esterification (in particular acetylation), etherification (in particular cationization or hydroxyalkylation), crosslinking or hydrolysis by the acidic and oxidative routes.

The physical treatments comprise in particular all the known operations of precooking, cooking, extrusion, spray-drying or drying, those known by the terms "Heat Moisture Treatment" or "Annealing", operations of treating with microwaves or ultrasound, of plasticization or granulation.

And it is remarkable to emphasize, as the applicant also observed, that the use of modified legume starches made it possible to prepare labeling adhesives free of casein and having, nevertheless, a behavior very similar to commercial casein-based adhesives, especially in terms of adhesive characteristics, general resistance to water and storage stability.

The labeling adhesives to which the present invention relates may contain, in addition to at least one legume starch as defined above, any one of the components customarily used in commercial labeling adhesives and/or recommended in any of the prior art documents cited.

Preferably, a legume starch as selected is combined, inter alia, with another polymer of natural origin, of a polysaccharide or protein nature.

The subject of the present invention is in particular the joint use, in the preparation of a labeling adhesive, of a legume starch as selected and of a polymer of natural origin selected from the group comprising starches, plant proteins, animal proteins and any mixtures of at least any two of these products.

As already stated, it is possible to combine with each other two or more legume starches, each possibly having been modified or not. It is also possible to combine at least one legume starch with at least one starch other than a legume starch (for example obtained from maize, wheat, potato, cassava or rice), it being possible for the latter to be native or modified. According to a very advantageous variant, the legume starch is combined with at least one native or modified starch other than a legume starch having an amylopectin content of at least 80% by weight (dry/dry) and in particular with a native or modified waxy maize, wheat, potato or rice starch.

In a particularly efficient manner, the native or modified legume starch is combined with a waxy maize starch, in particular with a waxy maize starch which has been physically modified, in particular by (pre)cooking, spray-drying or extrusion, and optionally chemically modified.

Such pregelatinized waxy maize starches are marketed in particular by the applicant company under the trademark DEXYLOSE®.

According to another variant, the native or modified legume starch is combined, in the presence or absence of other starches, with a protein selected from the group comprising plant proteins (for example obtained from maize, wheat, potato etc., or legumes), casein, gelatin, fish proteins and any mixtures of at least any two of these products.

According to another variant, the labeling adhesive composition prepared according to the invention is free of protein, in particular free of casein or gelatin. It may moreover contain, in widely variable proportions, a product selected from the group comprising rheology agents, in particular plasticizing, fluidifying, solubilizing, viscosifying, crosslinking, insolubilizing or stabilizing agents, alkaline agents, resins and gums of natural or synthetic origin, inorganic fillers, synthetic polymers, antifoaming agents, preservatives and colorings.

Although the present invention does not exclude the use of legume starch in labeling adhesives having a very high dry solids content, including about 100% in the case of "hot melt"-type adhesives, said dry solids content is preferably between 30 and 60%, the liquid phase being generally aqueous, completely or in part.

The applicant company observed in particular that the use of at least one legume starch in accordance with the invention made it possible to prepare labeling adhesives satisfying the abovementioned criteria a) to i) while having a dry solids content greater than 40%, i.e. a dry solids content higher than a large number of aqueous glues based on starch(es) and/or casein which are used in the industrial context, in particular for sticking labels to glass articles.

This dry solids content may in particular be between 41 and 50%.

Preferably, the labeling adhesives prepared according to the invention have moreover a BROOKFIELD viscosity, measured at 25° C., of between 20 000 and 150 000 mPa·s and in particular between 40 000 and 130 000 mPa·s.

Furthermore, the labeling adhesives prepared in accordance with the invention may be provided in the form of powdered compositions ready to be dispersed in water or of ready-to-use liquid or pasty compositions.

The present invention will now be described in greater detail with the aid of the examples which follow and which are not at all limiting.

Example 1

Control Composition T1

A control labeling composition (hereinafter COMPOSITION T1) based on pregelatinized modified waxy maize starch DEXYLOSE® I 231 and crosslinked wheat starch COLLYS® BR is prepared.

276 g of DEXYLOSE® I 231, 69 g of COLLYS® BR and 6.9 g of ammonium acetate are dispersed in 533 g of tap water, with stirring at 150 revolutions/minute and at 25° C.

Still with stirring, this mixture is heated to 72° C. and kept at this temperature for 10 minutes. 112 g of urea are added and then the mixture is stirred again for 30 minutes. The composition obtained is cooled to 50° C. and 3.1 g of preservative PREVENTOL® D2 marketed by the company BAYER are added.

The resulting COMPOSITION T1 has a dry solids (MS) content of about 43.5% and an initial viscosity (BROOKFIELD viscosity—20 revolutions/minute), measured at 25° C., of about 65 000 mPa·s. Its initial pH is 6.9.

After 1 month of storage at 25° C., this viscosity is stabilized at a value of about 60 000 mPa·s. The pH reached is 7.7.

Said COMPOSITION T1 moreover has, at 45° C., an initial viscosity of about 47 000 mPa·s. After 1 month of storage at 45° C., corresponding by convention to 9 months of storage at 25° C., this viscosity at 45° C. increased to a value of about 85

000 mPa·s. The pH reached is 8.3, that is an increase of the order of 8.3–6.9=1.4 pH unit relative to the initial pH.

Compositions in Accordance with the Invention

Labeling compositions in accordance with the invention (designated hereinafter COMPOSITIONS 1A to 3A respectively) are moreover prepared according to the general protocol described above for the control COMPOSITION T1, except that the crosslinked wheat starch COLLYS® BR is replaced with an equivalent weight of each of the legume starches STARCHES 1 to 3, respectively, described below.

COMPOSITION 1A: STARCH 1=native pea starch having a starch content greater than 98% (dry/dry), said starch having an amylose content of about 35% (dry/dry) and a protein content of about 0.35% (dry/dry).

COMPOSITION 2A: STARCH 2=STARCH 1 physically modified by extrusion.

COMPOSITION 3A: STARCH 3=pea starch physically modified by cooking on a drum-type dryer and having a starch content greater than 98%, said starch having an amylose content of about 38% and a protein content of about 0.20%.

The COMPOSITION 1A initially has a pH of 7.2, a viscosity at 25° C. of about 75 000 mPa·s and a viscosity at 45° C. of about 54 000 mPa·s.

The COMPOSITION 2A initially has a pH of 6.6, a viscosity at 25° C. of about 130 000 mPa·s and a viscosity at 45° C. of about 60 000 mPa·s.

The COMPOSITION 3A initially has a pH of 6.6, a viscosity at 25° C. of about 125 000 mPa·s and a viscosity at 45° C. of about 70 000 mPa·s.

Tests of Storage Stability

Storage tests carried out for 1 month at 25° C. show overall that the COMPOSITIONS 1A to 3A according to the invention have a storage stability which is at least as good as that of the COMPOSITION T1.

Storage tests carried out for 1 month at 45° C. (equivalent to 9 months at 25° C.) moreover showed that the COMPOSITIONS 1A and 2A were overall more stable than the COMPOSITION T1.

Thus, after 1 month of storage at 45° C.:

the COMPOSITION 1A had a viscosity of 63 000 mPa·s, which is relatively close to the initial viscosity at 45° C. (54 000 mPa·s), and an increase in pH of the order of 1 pH unit, and the COMPOSITION 2A had a viscosity of 66 000 mPa·s, which is very close to the initial viscosity at 45° C. (60 000 mPa·s), and an increase in pH of the order of 1.2 pH unit.

Tests of Measurement of Dry Adhesion

These tests are carried out according to the document entitled "APPAREIL POUR LE CONTROLE DE L'ADHERENCE FIPAGO SYSTEME PKL [APPARATUS FOR MONITORING ADHESION FIPAGO SYSTEM PKL]", said document and said apparatus being provided by STRÖHLEIN Instruments.

As indicated in said document, said apparatus may be used for monitoring glues in general in accordance with the AFNOR T 76-501 standard.

In the present case, the peeling resistance of said paper label is measured either immediately after sizing a paper label (measurement at T0), or 5 minutes after said sizing (measurement at T5).

For each measurement, the label (dimensions=15 cm×5 cm) is placed, on the one hand, on a fixed support and, on the other hand, on a dry and moving glass plate, attached to the lever of the apparatus.

A roller is passed over the label, carrying out the sizing, and then the lever is released immediately (measurement at T0) or after about 5 minutes (measurement at T5), thus peeling the label off the glass. The "FIPAGO-SYSTEM PKL" apparatus measures the stress during the peeling and estimates it on a scale ranging from 0 to 100, the theoretical value of 100 corresponding to the absence of peeling and the value 0 to complete peeling without the slightest adhesion.

The test of measurement of dry adhesion thus described (designated hereinafter "FIPAGO TEST") was carried out on the control composition (COMPOSITION T1) and on the COMPOSITIONS 1A to 3A according to the invention described above.

The results obtained (values from 0 to 100) at T0 and T5 for said compositions are presented below:

| FIPAGO TEST | | |
|---|---|---|
| | T0 | T5 |
| COMPOSITION T1 | 25 | 30 |
| COMPOSITION 1A | 27 | 33 |
| COMPOSITION 2A | 28 | 30 |
| COMPOSITION 3A | 35 | 38 |

These results show that for this criterion, legume starches can advantageously replace a crosslinked wheat starch. In particular, pea starches which have not been chemically modified, or which have not even been modified either chemically or physically (cf. STARCH 1 contained in the COMPOSITION 1A), are perfectly suitable.

A pea starch which has been pregelatinized on a drum-type dryer like STARCH 3 contained in the COMPOSITION 3A is found even here to have a significantly higher level of performance than the crosslinked wheat starch.

Tests of Sticking to Glass Wetted with Condensed Water

This test is designed to evaluate, at room temperature, the behavior of a label coated with glue to be tested, the label being affixed to a glass surface which is constantly wetted with condensed water. This test makes it possible to predict the sticking behavior, at room temperature, of a label affixed to a bottle filled, at room temperature, with a refrigerated liquid (before final packaging and before drying of the glue joint).

The equipment used consists of a glass plate positioned vertically and one of whose sides is cooled to 5° C. by circulation of cold water. Upon contact with the cold surface, steam condenses on the other side of the glass plate, this other side being intended to receive the label coated with the glue to be tested.

In order to prepare the label to be stuck, a glue film is deposited on another glass plate with the aid of a film applicator.

A label of the beer label type, of known weight and surface area, is affixed to this glue film. Pressure is exerted by passing an 800 g roller once over the label (i.e. back and forth), so as to obtain a 30 g/m²±10% glue deposit. It is checked by weighing that the quantity of glue transferred indeed corresponds to a deposit of this order. If necessary, several passages of the roller are made in order to obtain the desired deposit.

The label thus sized is then applied to the side of the vertically positioned glass plate where the condensation water forms.

The results are expressed as time values and represent the time necessary, expressed in minutes, for the label to slide 2 mm from its initial position, under the action of the condensation water.

According to the test described above, the COMPOSITION T1 (control) and the COMPOSITIONS 1A to 3A in accordance with the invention gave the results below:
COMPOSITION T1: 30 minutes
COMPOSITION 1A: 20 minutes
COMPOSITION 2A: 90 minutes
COMPOSITION 3A: 45 minutes These results show that overall, for this criterion, legume starches can entirely replace a crosslinked wheat starch.

STARCHES 2 and 3 (contained in the COMPOSITIONS 2A and 3A respectively), which have not been chemically but only physically modified (by extrusion and on a drum-type dryer respectively), prove here to have significantly higher levels of performance than crosslinked wheat starch.

In the specific context of this test, the native pea starch-based COMPOSITION 1A is found to have a lower level of performance than the COMPOSITION T1 while having properties of sticking to wet glass which are not negligible, and which are potentially capable of being improved by qualitative or quantitative adjustment of the components of the adhesive.

Test of Resistance to Condensation

This test is designed to evaluate the condensation resistance of a label stuck with the glue to be tested to a glass surface which is initially dry but is constantly moistened by condensation of water some time after the sticking of the label.

This test makes it possible to predict in particular the behavior of a labeled bottle on leaving a refrigeration system.

The equipment and the procedure used are identical to those described above for the "TESTS OF STICKING TO GLASS WETTED WITH CONDENSATION WATER" except that, in the present case, the label is sized (in an amount of 30 g/m²±10%) onto a dry glass plate and that the whole is left to dry at room temperature for 24 hours before initiating the condensation phenomenon.

The results are expressed as time values and represent the time, expressed in minutes, for the label, when subjected to condensation, to slide 2 mm from its initial position.

According to this test, the following results were obtained for the COMPOSITION T1 (control) and the COMPOSITIONS 1A to 3A in accordance with the invention:
COMPOSITION T1: 90 minutes
COMPOSITION 1A: 30 minutes
COMPOSITION 2A: 120 minutes
COMPOSITION 3A: 90 minutes The same general conclusions as those presented for the "TESTS OF STICKING TO GLASS WETTED WITH CONDENSATION WATER" may be made.

Other Tests

The applicant company has moreover observed that the adhesive compositions according to the invention had:
- a "short" texture which should limit the formation of smears or splashes during their industrial use,
- organoleptic characteristics (color, odor in particular) which are completely compatible with their industrial use,
- good capacity for sticking labels to bottles intended to be immersed in cold or ice-cold water,
- a capacity to be completely removed from the surface of glass articles with hot water (50° C.) as easily as the COMPOSITION T1.

Conclusion.

The results of the tests described in the present EXAMPLE 1 show that, overall, a legume starch may be advantageously used for the preparation of a labeling adhesive composition, without necessarily having undergone beforehand a chemical modification treatment.

That is in particular the case for legume starches solely physically treated like STARCHES 2 and 3.

It is moreover remarkable to emphasize that a native legume starch, i.e. having undergone no prior, even physical, treatment like STARCH 1, makes it possible to prepare adhesive compositions having excellent storage stability and dry adhesion properties while having properties of sticking to wet glass and of resistance to condensation which, in the present case, can indeed be improved, but are not at all negligible.

Example 2

Control Composition T2

A control labeling composition (hereinafter COMPOSITION T2) is prepared according to the same general protocol as that described above for the COMPOSITION T1, except that, in the present case, the DEXYLOSE® I 231 starch is replaced with another pregelatinized waxy maize starch, the weight ratio between said waxy maize starch and crosslinked wheat starch COLLYS® BR still being 4/1.

The COMPOSITION T2 has:
a dry solids (MS) content of about 46.8%,
a viscosity, after 1 day of storage at 45° C., of about 25 000 mPa·s,
a viscosity, after 1 month of storage at 45° C., of about 27 000 mPa·s.

Compositions In Accordance With The Invention

Labeling compositions in accordance with the invention (designated hereinafter COMPOSITIONS 1B to 7B) are moreover prepared according to operating protocols which are distinguishable from that described above for the COMPOSITION T2 by the following respective differences:
COMPOSITION 1B: replacement of crosslinked wheat starch with STARCH 1 described in EXAMPLE 1,
COMPOSITION 2B: replacement of crosslinked wheat starch with STARCH 2 described in EXAMPLE 1,
COMPOSITION 3B: as for COMPOSITION 2B, except that a pregelatinized waxy maize starch/STARCH 2 weight ratio of 3/2 instead of 4/1 is used,
COMPOSITION 4B: replacement of crosslinked wheat starch with STARCH 4, said STARCH 4 being obtained by cationization (nitrogen level of about 0.45%) and crosslinking (with sodium trimetaphosphate) of STARCH 1 described above,
COMPOSITION 5B: replacement of crosslinked wheat starch with STARCH 5, said STARCH 5 being obtained by fluidification and stabilization, in a dry phase, of STARCH 1 according to the teachings of patent EP 1 094 082 in the name of the applicant (use of hydrochloric acid and of urea-formaldehyde resin),
COMPOSITION 6B: replacement of crosslinked wheat starch with a STARCH 2/STARCH 4 mixture in a 2/1 weight ratio, the weight ratio between the pregelatinized waxy maize starch and said mixture being moreover 7/3,
COMPOSITION 7B: replacement of the crosslinked wheat starch with a STARCH 4/STARCH 6 mixture (weight ratio: 1/1), said STARCH 6 being obtained by fluidification and acetylation, in an aqueous phase, of STARCH 1.

General Characteristics

The table below presents, for each of the COMPOSITIONS T2 (control) and 1B to 7B (according to the invention) and for a conventional composition based on casein (control COMPOSITION T3), the values of dry solids content (MS in %), initial BROOKFIELD viscosity measured at 25° C. (Vi 25), BROOKFIELD viscosity after one day of storage at 45° C. (Vi 45) and BROOKFIELD viscosity after 1 month of storage at 45° C. (Vf 45), said viscosities being expressed as thousands ($10^3$) of mPa·s.

|  | MS** | Vi 25* | Vi 45* | Vf 45* |
| --- | --- | --- | --- | --- |
| COMP. T2 | 46.8 | 61 | 25 | 27 |
| COMP. T3 | 35.6 | 43 | 2.8 | 3.0 |
| COMP. 1B | 44.7 | 115 | 43.8 | 43 |
| COMP. 2B | 47.8 | 85 | 26.4 | 30 |
| COMP. 3B | 39.7 | 91 | 58 | 65 |
| COMP. 4B | 37.1 | 112 | ND | ND |
| COMP. 5B | 46.4 | 42 | ND | ND |
| COMP. 6B | 37.8 | 70 | 40 | 33 |
| COMP. 7B | 43.9 | 52 | 12 | 10 |

*as thousands of mPa · s
**as %
ND: not determined

Conclusion

These results show overall that by using native, physically and/or chemically modified, legume starches, or combinations between such starches, it is now possible to prepare labeling adhesives which are stable or very stable and have:
widely variable dry solids contents which may be less than or greater than 40%, including between 41 and 50%,
widely variable viscosities, for example BROOKFIELD viscosities, measured at 25° C., of between 40 000 and 130 000 mPa·s.

Example 3

Tests of Measurement of Dry Adhesion ("FIPAGO TEST")

According to the protocol described in EXAMPLE 1, one evaluates the dry adhesion ("FIPAGO TEST") of the COMPOSITIONS 1B to 7B in accordance with the invention and of the COMPOSITIONS T2 and T3 (controls), described in EXAMPLE 2.

The results obtained (values from 0 to 100) at T0 and T5 are presented below.

| FIPAGO TEST | | |
| --- | --- | --- |
|  | T0 | T5 |
| COMPOSITION T2 | 30 | 35 |
| COMPOSITION T3 | 25 | 60 |
| COMPOSITION 1B | 25 | 40 |
| COMPOSITION 2B | 33 | 45 |
| COMPOSITION 3B | 15 | 25 |
| COMPOSITION 4B | 35 | 50 |
| COMPOSITION 5B | 38 | 60 |
| COMPOSITION 6B | 25 | 45 |
| COMPOSITION 7B | 45 | 65 |

These results confirm overall that, for the criterion studied here, use may be made advantageously of both native (cf. COMPOSITION 1B) and physically modified (cf. COMPOSITION 2B) legume starches in order to replace the crosslinked wheat starch.

These results moreover show that it is also possible here to obtain remarkable performance levels, higher than those obtained with the crosslinked wheat starch, using:
legume starch that has been chemically modified, for example by cationization or stabilization, such as those contained in the COMPOSITIONS 4B and 5B, or combinations between at least two legume starches such as those contained in the COMPOSITIONS 6B and 7B.

These performance levels are all the more remarkable since they can prove, at T0 and/or at T5, at least equal if not higher than those obtained with the COMPOSITION T3 based on casein.

That is the case here in particular for the COMPOSITIONS 5B and 7B in accordance with the invention.

Other Sticking Tests

The performance levels of the COMPOSITIONS 1B to 7B according to the invention and of the COMPOSITIONS T2 and T3 (controls) are evaluated according to the protocol described in EXAMPLE 1 for the "TESTS OF STICKING TO GLASS WETTED WITH CONDENSED WATER" (hereinafter "TEST 1") and the "TESTS OF RESISTANCE TO CONDENSATION" (hereinafter "TEST 2"), respectively.

The values obtained are presented below. They are expressed in minutes, it being understood that the expression "HR" ("High Resistance") means that the time is greater than 24 hours, i.e. that after 24 hours of tests, the label has not slided or has slided by less than 2 mm.

|  | TEST 1 | TEST 2 |
| --- | --- | --- |
| COMPOSITION T2 | 15 | 30 |
| COMPOSITION T3 | HR* | HR* |
| COMPOSITION 1B | 20 | 30 |
| COMPOSITION 2B | >60 | 60 |
| COMPOSITION 3B | HR* | HR* |
| COMPOSITION 4B | 30 | 30 |
| COMPOSITION 5B | 35 | HR* |
| COMPOSITION 6B | HR* | HR* |
| COMPOSITION 7B | 60 | 60 |

HR* = duration > 24 hours

These results show that, in the present case, all the compositions in accordance with the invention (including, the COMPOSITION 1B based on native pea starch) have performance levels at least equal to the CONTROL COMPOSITION T2, which combines a crosslinked wheat starch with pregelatinized waxy maize starch.

Most of the compositions in accordance with the invention tested here give results which are significantly better than those obtained with the COMPOSITION T2, both for TEST 1 and for TEST 2.

That is in particular the case for the COMPOSITIONS 3B, 5B and 6B which, even more remarkably, make it possible to achieve, for at least one of the two TESTS 1 and 2, or even both, performance levels equal to those obtained with the COMPOSITION T3 based on casein.

The invention claimed is:

1. A process for labelling a support, comprising:
sizing a label with a labeling adhesive composition comprising a native or modified legume starch having an amylose content of at least 30% and at most 60% by weight (dry/dry) and a protein content from 0.1 to 0.8%; and
affixing the sized label to a support, thereby providing a labeled support, wherein,
the labeling adhesive composition is free of gelatine and casein.

2. The process according to claim 1, wherein the legume starch has an amylose content at least equal to 30% and less than 50% by weight (dry/dry).

3. The process according to claim 1, wherein the legume starch has undergone at least one modification treatment selected from the group consisting of chemical treatments, physical treatments and enzymatic treatments.

4. The process according to claim 1, wherein the labeling adhesive composition has a protein content consisting of the protein of the native or modified legume starch.

5. The process according to claim 1, wherein the labeling adhesive composition contains another polymer of natural origin, of a polysaccharide nature.

6. The process according to claim 5, wherein said polymer of natural origin is one or more starches.

7. The process according to claim 5, wherein said polymer of natural origin is one or more starches other than native or modified legume starch.

8. The process according to claim 5, wherein said polymer of natural origin is a native or modified starch having an amylopectin content of at least 80% by weight (dry/dry).

9. The process according to claim 8, wherein the starch is a waxy maize starch.

10. The process according to claim 8, wherein the starch is a waxy maize starch, which has been physically modified.

11. The process according to claim 8, wherein the starch is a waxy maize starch which has been physically modified by (pre)cooking, spray-drying or extrusion.

12. The process according to claim 5, wherein the labeling adhesive composition contains at least another native or modified legume starch.

13. The process according to claim 1, wherein the labeling adhesive composition has a dry solids content of between 30 and 60%.

14. The process according to claim 1, wherein the labeling adhesive composition has a dry solids content greater than 40%.

15. The process according to claim 1, wherein the labeling adhesive composition has a dry solids content of between 41 and 50%.

16. The process according to claim 1, wherein the labeling adhesive composition has a BROOKFIELD viscosity, measured at 25° C., of between 20,000 and 150,000 mPa·s.

17. The process according to claim 1, wherein the labeling adhesive composition has a BROOKFIELD viscosity, measured at 25° C., of between 40,000 and 130,000 mPa·s.

18. The process according to claim 1, wherein said support is selected from glass articles.

19. The process according to claim 1, wherein the adhesive composition is a powdered composition ready to be dispersed in water or a ready-to-use liquid or pasty composition.

* * * * *

UNITED STATES PATENT AND TRADEMARK OFFICE
CERTIFICATE OF CORRECTION

PATENT NO. : 8,470,119 B2  Page 1 of 1
APPLICATION NO. : 10/557614
DATED : June 25, 2013
INVENTOR(S) : Mentink et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1376 days.

Signed and Sealed this
Eighth Day of September, 2015

Michelle K. Lee
*Director of the United States Patent and Trademark Office*